Dec. 4, 1928.                                                     1,693,749
E. E. GLOMSTEAD ET AL
MACHINE FOR MAKING ABSORBENT ROLLS
Filed May 21, 1927             7 Sheets-Sheet 1

Inventor
Edwin E. Glomstead
John A. Williamson
By Fisher, Towle, Clapp & Soans Attys.

Dec. 4, 1928.

E. E. GLOMSTEAD ET AL 1,693,749

MACHINE FOR MAKING ABSORBENT ROLLS

Filed May 21, 1927

Inventors
Edwin E. Glomstead
John A. Williamson
By: Fisher, Fowle, Clapp & Soans Attys

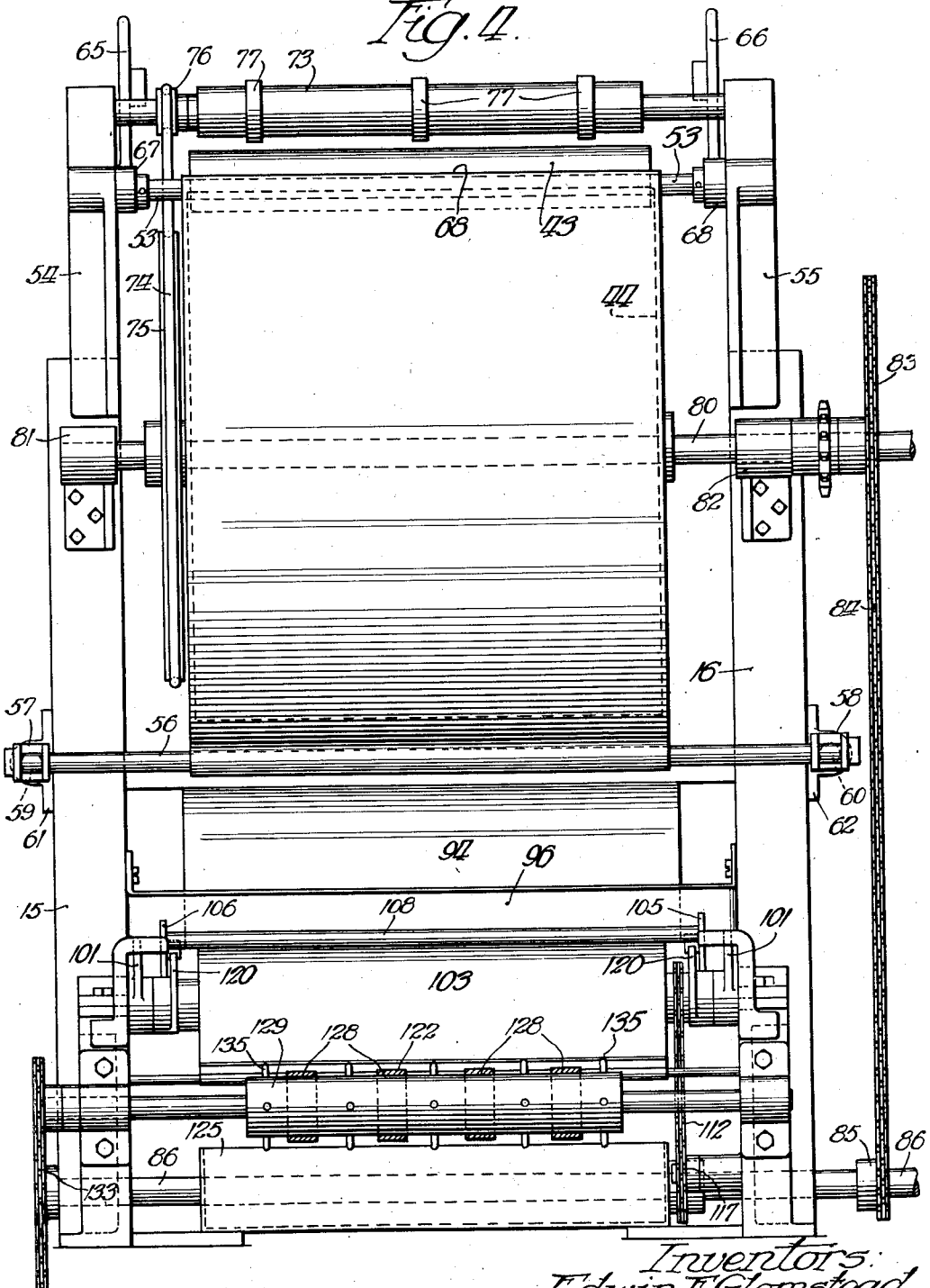

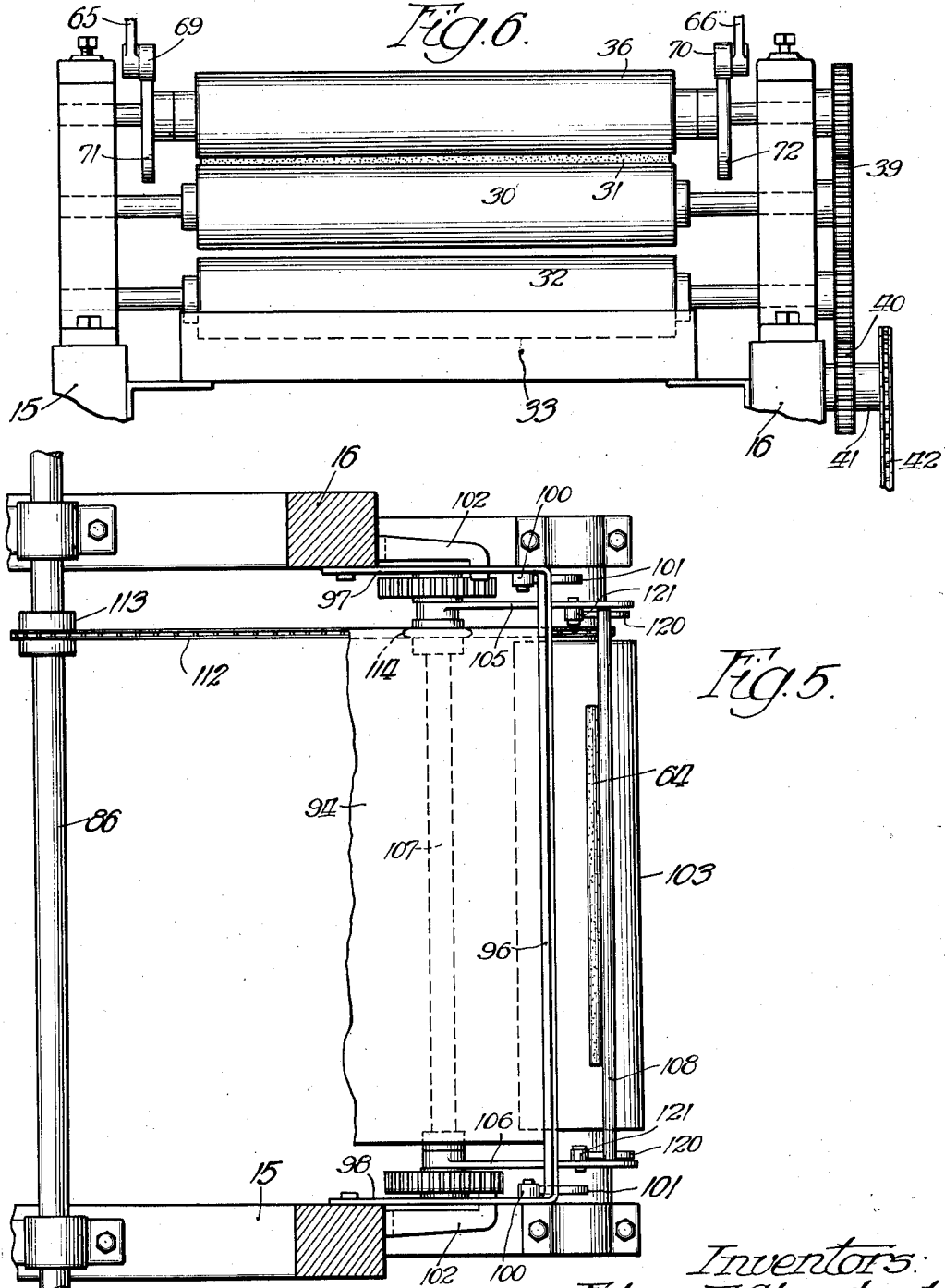

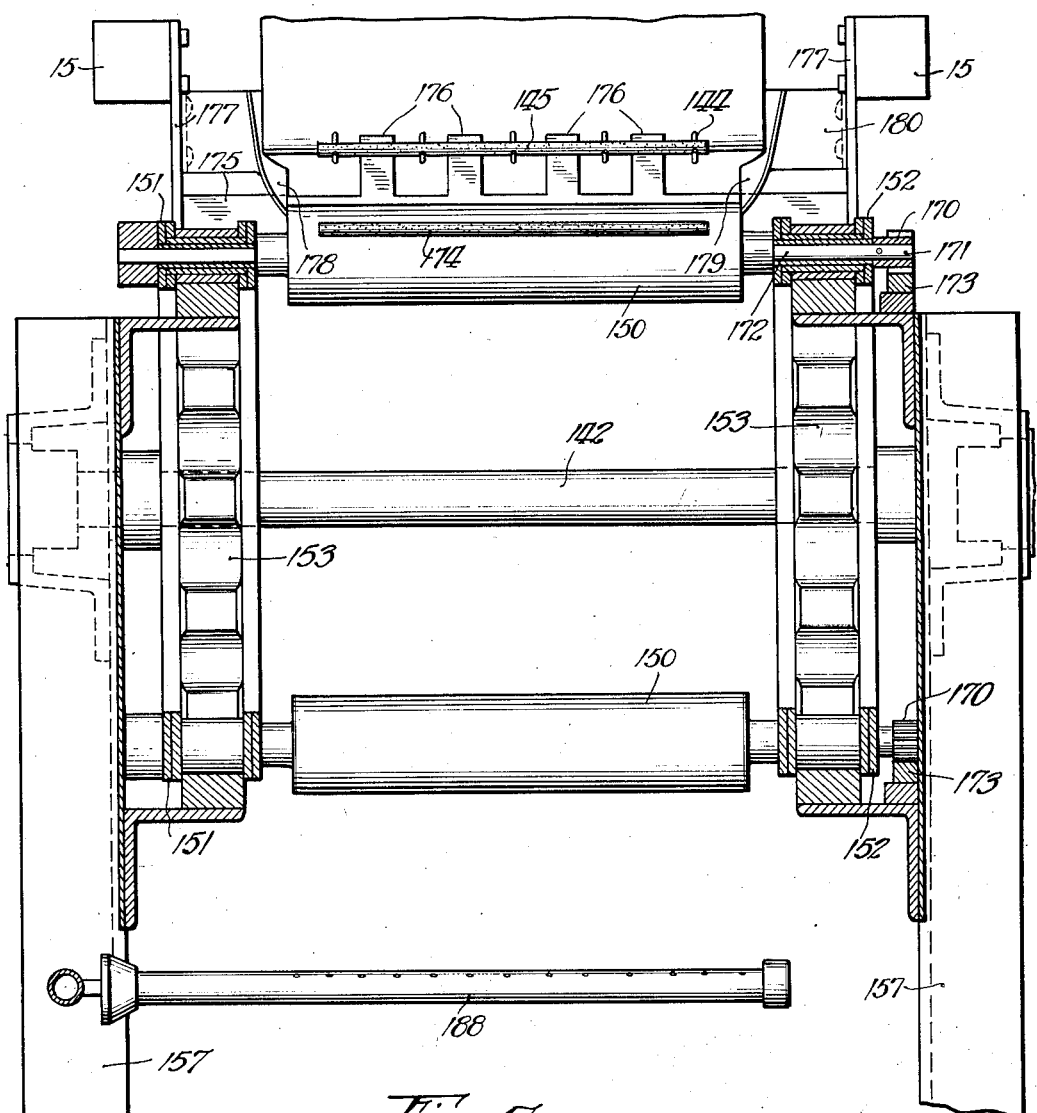

Dec. 4, 1928. 1,693,749
E. E. GLOMSTEAD ET AL
MACHINE FOR MAKING ABSORBENT ROLLS
Filed May 21, 1927 7 Sheets-Sheet 7
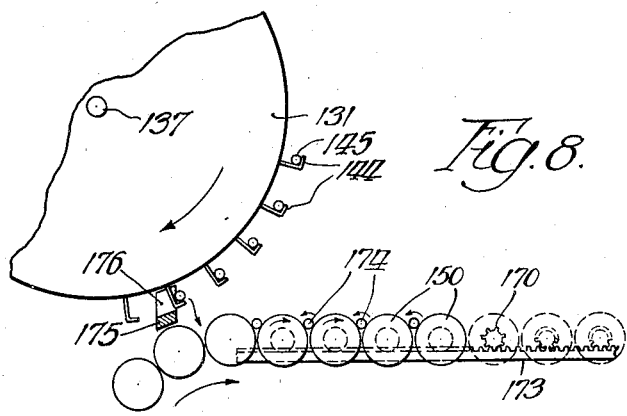
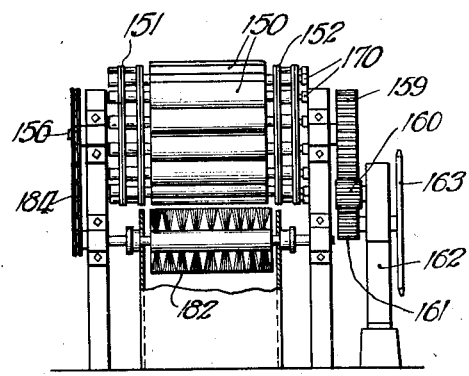
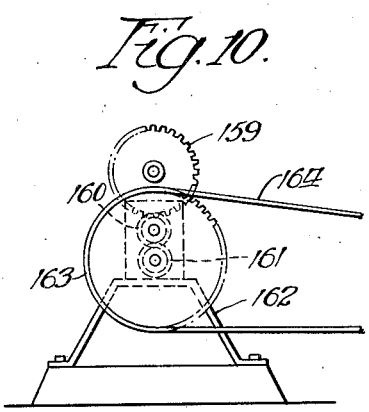
Inventors.
Edwin E. Glomstead.
John A. Williamson
By Fisher, Fowle, Clapp & Soans Attys Patented Dec. 4, 1928.

1,693,749

UNITED STATES PATENT OFFICE.

EDWIN E. GLOMSTEAD AND JOHN A. WILLIAMSON, OF NEENAH, WISCONSIN, ASSIGNORS, BY MESNE ASSIGNMENTS, TO INTERNATIONAL CELLUCOTTON PRODUCTS CO., OF CHICAGO, ILLINOIS, A CORPORATION OF DELAWARE.

MACHINE FOR MAKING ABSORBENT ROLLS.

Application filed May 21, 1927. Serial No. 193,358.

This invention relates to machine for making absorbent rolls, and particularly absorbent rolls of relatively small diameter such as are used extensively by dentists in the practice of their profession.

The principal object of the invention is to provide a machine for automatically producing rolls such as above described from a sheet of fibrous material such as paper, without manually handling the material during the production of the rolls.

Other objects of the invention are; to provide a machine of the class described which will automatically roll sheets of fibrous material into rolls which will be relatively stiff and self supporting; to provide means for coating such a suitable sizing or binding material to prevent the roll from unrolling; to provide such coating means which will be effective to impregnate the surface portion with said sizing material; to provide means for ironing or smoothing the roll after it is so coated; to provide means for producing rolls such as above described from relatively long strips, or supply rolls of material; to provide automatically operative means for separating sheets of pre-determined size from the relatively long strip or supply roll; to provide means for partially or completely drying the coated roll; and, in general, to provide an improved machine of the class described.

Other objects and advantages of the invention will be understood by reference to the following specification and accompanying drawings in which we have illustrated a machine for making rolls of the class described, from strips of paper which are supplied in the form of rolls, and in which drawings.

Figure 2:
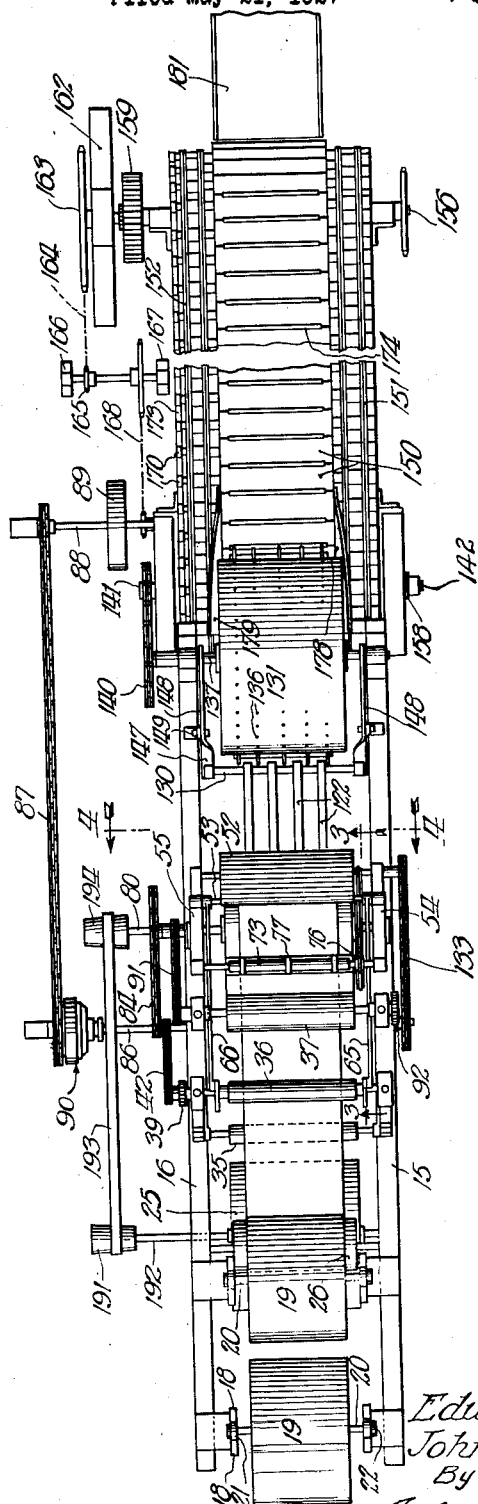
Fig. 2 is a plan.
Figure 3:
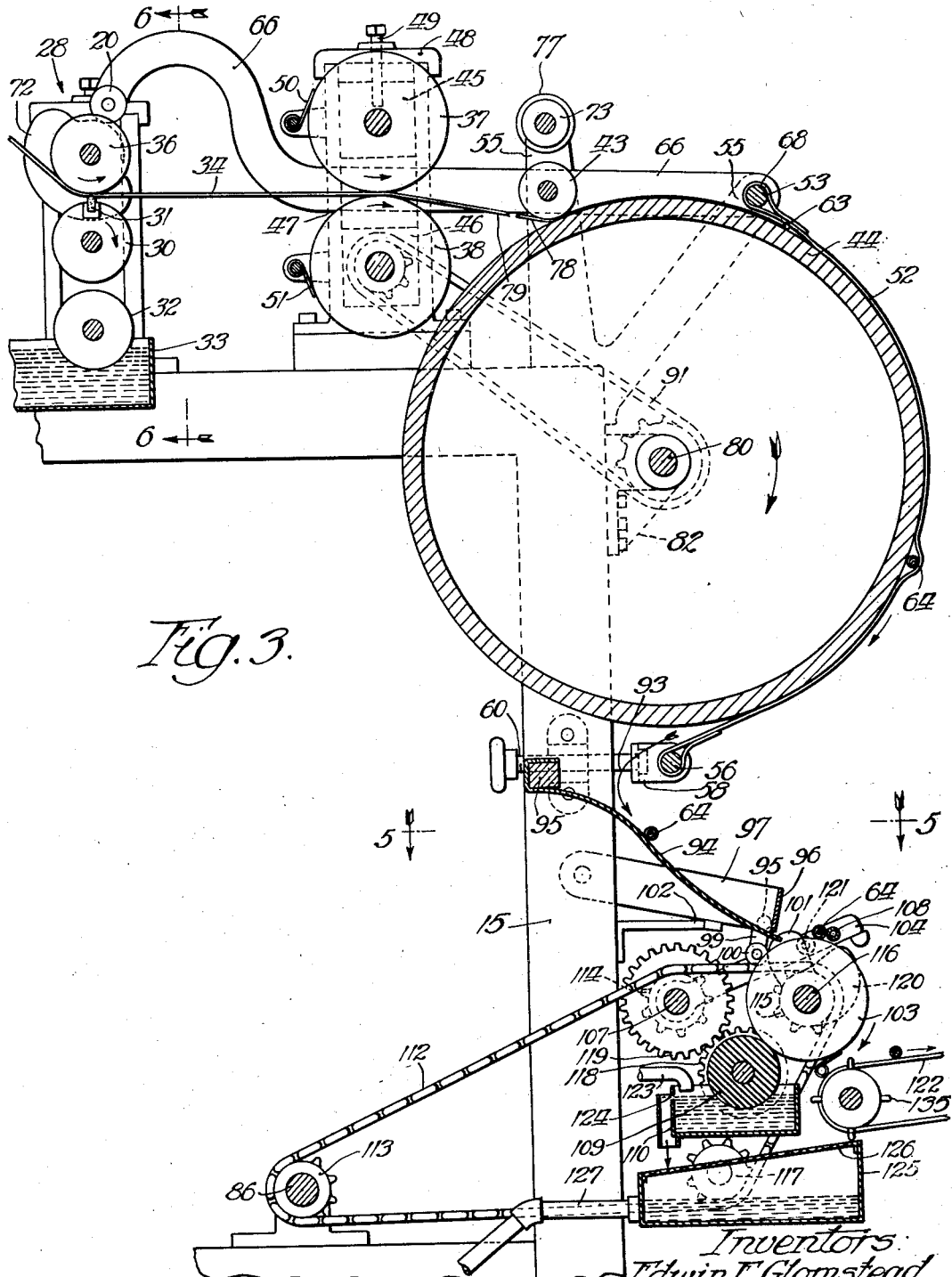

Figs. 3 and 4 are sections on the lines 3—3 and 4—4 respectively of Fig. 2.

Figs. 5 and 6 are sections on the lines 5—5 and 6—6 respectively of Fig. 3.

Figure 1:
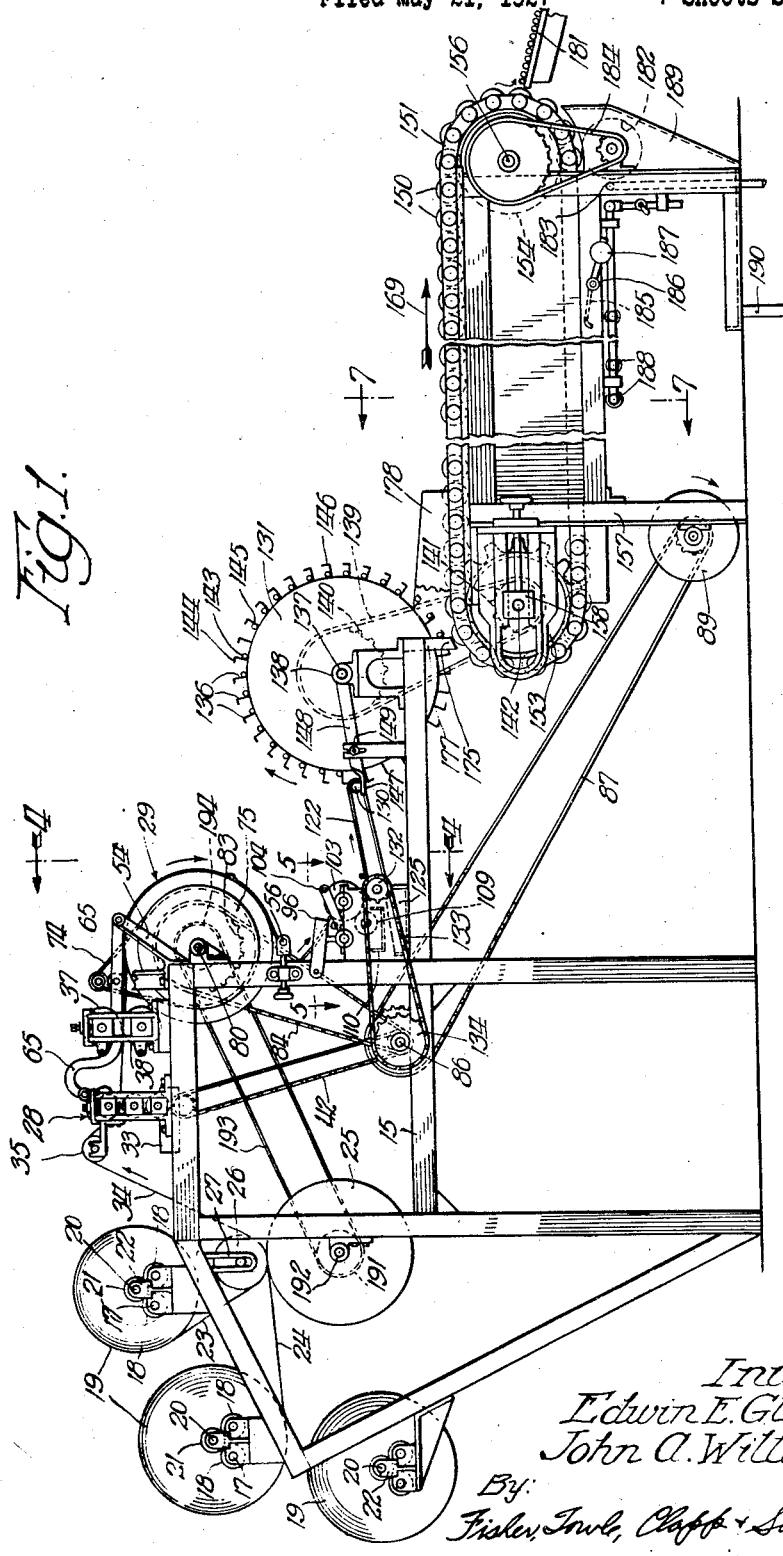
Fig. 1 is a side elevation.

Fig. 7 is a section on the line 7—7 of Fig. 1.

Fig. 8 is a detail illustrating the operation of certain mechanism, this detail being somewhat diagrammatic.

Fig. 9 is an end elevation of the right hand end of Fig. 1.

Fig. 10 is a side elevation of the right hand side of Fig. 9, and

Figs. 11 and 12 are side and end elevations respectively of one of the rolls produced by the machine.

Referring now to the drawings, and particularly to Figs. 11 and 12, the roll which the machine is designed to produce consists of one or more sheets of fibrous material rolled into a roll, as clearly shown in Fig. 12, and of any desired length.

In the present instance, we make these rolls from crepe paper, such as is well known in the trade as cellucotton absorbent wadding, and the rolls are preferably made from sheets about thirteen inches in width so that the rolls are produced of the same width, after which they may conveniently be cut into sections of any desired length. For example, when the rolls are made from sheets thirteen inches in width, they may conveniently be cut into two sections of six inches in length, exclusive of trim, which has been found to be a convenient length for the finished product.

Referring now to Figs. 1 and 2, we have indicated a supporting frame consisting of side frame members 15 and 16 which are tied together by suitable cross-bars or connectors disposed at any desirable points so as to form a rigid supporting frame. At one end of the frame, the left-hand end in Figs. 1 and 2, is mounted a plurality of roll supporting members 17, which preferably comprise a pair of rolls 18—18 which are rotatably mounted in suitable brackets, which, in turn, are secured to the supporting frame in any desirable manner. Rolls of crepe paper indicated at 19, from which the absorbent rolls are to be made, are provided with an axial shaft 20 on which is mounted a suitable roll 21 adapted to be positioned on the two rolls 18—18 of each supporting member 17. The supporting members are also provided with suitable means such as end stops 22 for preventing endwise displacement of the shaft 20 and roll 21.

In some instances, only one of the rolls 19 will be used at one time and the others held in reserve for use when the other roll is used up, and in some instances where an absorbent roll of larger diameter is desired, two or three of the rolls may be used simultaneously, according to the diameter of the absorbent roll desired. We have shown two of the rolls in use, and the paper strip is drawn from these rolls as indicated at 23 and 24 over a feed roll 25, which is rotatably mounted on the supporting frame. A weighted roll 26, rotatably and vertically mounted by means of a slotted bracket 27 secured to the frame, is provided to normally press the strips 23 and 24 into engagement with the roll 25, so that rotation of the latter will be effective to draw the paper from the supply rolls 19—19, and to feed the material forward to the rolling mechanism, which will presently be described.

The feed roll 25 is preferably driven by means of a tapering pulley 191 which is secured to the shaft 192 of the feed roll and a belt 193 which extends around the said tapering pulley 191 and around a second reversely tapering pulley 194 secured to a driven shaft 80. Suitable well known mechanism (not shown) may be provided for shifting the belt 193 across the faces of the pulleys 191 and 194 and it will be apparent that by so shifting the belt, the speed of rotation of the feed roll 25 may be varied as desired. We prefer to provide such variable speed driving arrangement for the roll 25, for several reasons, one of which is—in order to accommodate the machine to operation on paper which stretches and causes a slight variation in the speed at which the paper is rolled into rolls and at which the paper must be drawn from the supply rolls.

The strips of paper or other absorbent material are fed from the supply rolls, as above described, to a mechanism indicated at 28 which is operative to separate sheets of desired length from the forward end of the strip. The separated sheets are then operated upon by a mechanism indicated at 29 for rolling the sheets upon themselves to form a self-supporting absorbent roll and the rolls thus produced are coated with a suitable binder after which they are ironed and partially or completely dried by mechanical means.

The mechanism indicated at 28 for separating forward end portions from the strip to form the sheets comprises a roll 30 having a wick 31 extending longitudinally thereof and secured therein, which wick is adapted to absorb a quantity of fluid such as water by engaging a roll 32 which is partially submerged in a tank 33 containing the said fluid. The strips of paper 23 and 24 are together fed forward, in effect as a single strip 34, as will be apparent from an inspection of Fig. 1. The strip 34 is passed over a roll 35 journaled in a suitable bracket supported by the frame and from the roll 35 it is passed under a roll 36 which is disposed immediately above the wick bearing roll 30. From between the rolls 30 and 36, the strip 34 is passed between a pair of feed rolls 37 and 38 which are rotatably mounted in suitable bearing members also supported by the supporting frame. The rolls 30—32, and 36 are geared together by means of a train of gears 39, best shown in Fig. 6. The train of gears 39, is driven by means of a pinion 40 which is rotated through the medium of a sprocket 41 secured thereto and a chain 42 which engages a driven sprocket, which latter is driven by means which will be hereinafter explained. The rolls 30 and 32 are preferably spaced apart a slight distance as shown in Fig. 3, and the wick 31 in the roll 30 projects outwardly therefrom a distance sufficient to cause it to engage the surface of the roll 32 once in each revolution of the said roll 30. As the roll 32 rotates in a bath of water as before explained, the surface thereof will carry a quantity of water which will be absorbed by the wick 31 when it engages the wetted roll. The roll 32 may if desired, be provided with an absorbent surfacing of felt or other material so as to cause it to carry a larger supply of water which can be absorbed by the wick. The rolls 30 and 36 between which the paper strip 34 passes, are also spaced apart a slight distance as shown in Fig. 3, and as the wick 31 is carried into its up position, it engages the paper strip, pressing the latter against the roll 36, and thereby wets a relatively narrow zone of the paper extending transversely to the length of the strip. It will be apparent that for each revolution of the roll 30 and wick 31, a transversely extending zone of the strip 34 is wetted and further, that the spacing of the zones may readily be varied by varying the diameter of the roll 30.

The strip 34 extends between a pair of driven rolls 37 and 38 which are driven by suitable means so as to feed the strip forward under a roll 43 and onto the surface of a relatively large drum 44. The rolls 37 and 38 are mounted so that they may be caused to bear against each other under pressure, whereby the strip 34 is more positively fed forward thereby. In the present instance we prefer to mount the rolls 37 and 38 in bearing blocks 45 and 46 respectively, which are slidably mounted in a bracket 47 which is mounted on the supporting frame 26 and which is provided with a suitable slot for receiving and guiding the said bearing blocks. Means for applying pressure to cause the upper roll 37 to bear against the lower roll 38 is provided, and comprises a member 48 secured to and extending across the upper end of the bracket 47 and provided with a screw member 49 threadedly engaging an aperture in the member 48 and adapted to be turned downwardly to engage the bearing block 45 and thereby force the same towards the bearing block 46. Scrapers 50 and 51 are provided for scraping lint and other matter which gathers on the surfaces of the rolls 37 and 38 therefrom.

The forward end of the paper strip is fed into the surface of the drum 44 as above explained, and the drum 44 is rotated in a clock-wise direction (Fig. 3) so that the forward edge of the strip is brought into engagement with a relatively stationary belt member 52. The belt member 52 is anchored at one end by being looped over a rod 53 mounted in a pair of brackets 54 and 55 which are mounted on the main frame. The other end of the belt member is similarly anchored by being looped over a rod 56 which is carried at its opposite ends by means of members 57 and 58 which are in turn swively mounted on the ends of screw members 59 and 60. The screw members 59 and 60 threadedly engage apertures provided in mounting members 61 and 62 which are secured to the supporting frame 15. By means of the mounting just described for the lower end of the belt member 52, the belt may be caused to bear against the surface of the drum 44 with any desired degree of pressure and the co-efficient of friction therebetween may accordingly be varied by adjusting the screws 59 and 60.

When the forward end of the strip 34 engages the belt member 52, that is, enters between the belt member and the drum 44, the forward edge portion is turned upwardly and over upon the adjacent portion of the strip, as best shown at 63 in Fig. 3, to form the initial or inner turn of an absorbent roll. Continued forward movement of the strip 34 will continue the turning of the forward edge so that the strip is rolled upon itself to form a roll as indicated at 64, (Fig. 3) between the belt member and the drum.

In order to produce separate or independent rolls, such as indicated at 64, from the continuous strip 34, the strip is successively severed or broken at the relatively narrow wetted zones. Wetting the strips in the manner described facilitates breaking of the strip along a transversely extending line, since the paper reverts to its pulp form and loses a part of its tensile strength along the wetted zone. For breaking the strip along the wetted zones, we provide mechanism for raising and lowering the roller 43. The roller 43 is preferably a heavy roll and is rotatably mounted at its opposite ends on a pair of arms 65 and 66 which are pivotally mounted at their outer ends 67 and 68 respectively on the rod 53.

The inner ends of the arms 65 and 66 are provided with cam rolls 69 and 70 respectively which engage cams 71 and 72 respectively. which are secured to the shaft of the roll 36 which is driven as above explained. The cams 71 and 72 are adapted to raise the inner ends of the arms 65 and 66 so that the heavy roller 43 is brought into engagement with a driven roll 73. The roll 73 is journaled in suitable bearing brackets supported by the main frame 15, and it may conveniently be driven at a relatively high rate of speed by means of a belt 74 which extends around a large pulley 75 secured to the drum 44 and driven therewith, and around a small pulley 76 secured to the said roll 73.

When the arms 65 and 66 are raised and the roll 43 brought into engagement with the roll 73, the latter is effective to impart rapid rotation to the heavy roll 43 and to facilitate this action, the roll 73 may be provided with suitable tires 77 of rubber or other friction material. As shown in Fig. 1, when the arms 65 and 66 and the roll 43 are in raised position, the strip 34 of paper, will be drawn more or less taut between the drum 44 and feed rolls 37 and 38 and will rest against the under surface of the heavy roll 43. The heavy roll 43 is provided with a relatively smooth surface so that although it is driven by contact with the driven roll 73, it will not be effective to feed the paper strip forward, the smooth surface permitting the roll to slip with respect to the paper strip and the tautness of the paper being only of such a degree that such slipping is permitted.

When the cam 72 reaches the position in which it is shown in Fig. 3, the inner end of the arms 65 and 66 will be permitted to drop, with a quick movement, the cam being shaped to accomplish this result. When the arms are thus caused to drop, the roll 43 will correspondingly be dropped with a relatively quick movement and the strip of paper will be caused to break at the wetted zone between the feed rolls 37 and 38 and the roll 43. The roll 43 is maintained in its lower position for a period sufficient to cause the severed end 78 of the separated portion to be rolled down against the surface of the drum as the drum rotates. The forward free end 79 of the strip will drop into engagement with the surface of the drum and will be carried forward thereby as the drum rotates and as the strip is fed forward by the feed rolls 37 and 38. The mechanism just described is so synchronized with the wetting mechanism that the forward end portion of the strip will be separated from the strip in successive intervals, with the break occurring in substantially the same position.

The drum 44 is secured to a shaft 80 which is rotatably mounted in suitable bearing brackets 81 and 82 carried by the main supporting frame and on the shaft 80 is mounted a sprocket 83 which is connected by means of a chain 84 to a sprocket 85 which in turn is secured to a shaft 86. The shaft 86 may be driven by any suitable means and in the present embodiment we have shown a sprocket chain 87 which engages suitable sprockets on the shaft 86 and on the shaft 88 which latter is provided with a pulley 89 adapted to receive a belt which may be driven by a power shaft or the like. We prefer to provide clutch means indicated at 90 for the purpose of permitting optional drive of the shaft 86 by means of the said chain 87.

The feed rolls 37 and 38 may conveniently be driven by means of a chain 91 which passes over suitable sprockets secured to the shaft of the roll 38 and the shaft 80 of the drum, the roll 37 being driven by means of intermeshing gears disposed on the respective shafts of the rolls 37 and 38 as indicated at 92. The belt member 52 is preferably of such length that the separated sheet of material will be completely rolled before it has traveled the full length of the belt. By this means the absorbent roll is caused to roll itself more tightly by the additional rolling due to the extra length of the belt member. This will be readily understood by an inspection of Fig. 3, where we have indicated a sheet fully rolled at 64 and wherefrom it will be apparent that the roll will be forced to continue its rolling action until it is released or discharged from between the surface of the drum and the belt at the lower end of the latter.

As indicated by the arrow 93 (Fig. 3), the roll is discharged from between the belt member and the drum, into a receiving chute 94 which is secured at its upper end to a cross member 95 of the main frame. The chute 94 is inclined so as to cause the roll 64 to roll downwardly thereon to a position adjacent the lower end of the chute as indicated by the dotted circle 95 where its downward movement is arrested by means of a trap member 96. The trap member 96 comprises a substantially U-shaped member having leg portions 97 and 98 pivotally connected to the supporting frame at their free ends, as best shown in Figs. 3 and 5. The trap member 96 is provided with a downward extension 99 having a roller 100 pivoted thereto at its lower end, and this roller 100 is adapted to be engaged by a rotating cam 101 which is operative to raise the member 96 at regular intervals. The weight of the trap member causes the same to swing downwardly about its pivotal mounting, being limited in its downward movement by means of stops 102—102 which engage the lower edge of the leg portions 97 and 98 and which stop members are secured to the supporting frame.

When the trap or gate member 96 is raised by the said cam 101, the roll 64 which is then in the position indicated at 95 is permitted to drop on to a coating roll 103, which is continuously driven in a clock-wise direction, as viewed in Fig. 3. The roll 64 which is thus permitted to drop on to the coating roll 103 is retained on the said coating roll by means of a second trap or gate member 104 which comprises a pair of arms 105 and 106 which are pivotally mounted on a shaft 107, and which are connected at their outer or free ends by means of a rod or small roller 108. The rod or roller 108 is rotatably mounted between the said outer ends of the arms 105 and 106. It will be readily understood from an inspection of Figs. 3 and 5 that while the coating roll 103 is rotated, the absorbent roll 64 retained thereon by the small roll 108 will be caused to rotate by frictional engagement with the coating roll, and will consequently receive a coating of binder or sizing material which may be applied to the surface of the said coating roll.

We prefer to coat the absorbent rolls 64 with a solution of starch and glycerine in water and we accordingly provide mechanism for applying such a solution to the surface of the coating roll 103. This means, in the present embodiment, comprises a composition roll 109, preferably rubber or other material which is adapted to carry a quantity of the solution from a tank 110 upwardly and to apply the same to the surface of the coating roll with which surface the roll 109 contacts. The coating roll 103 may be rotated by means of a chain 112 which passes over a sprocket 113 secured to the driven shaft 86 and which chain engages a sprocket 114 secured to the shaft 107, a sprocket 115 secured to the shaft 116 on which the coating roll is also secured and over an idler sprocket 117 from which it extends back to the driven sprocket 113. The roll 109 may be driven by means of a gear 118 secured to the shaft of the roll 109 and a gear 119 which meshes with the gear 118 and is secured to the driven shaft 107. The gate roller 108 is adapted to be raised by means of rotating cams 120, which are secured to the shaft 116 and which are adapted to engage cam rollers 121 secured to the oppositely disposed arms 105 and 106. It will be apparent that when the cams 120 engage the cam rollers 121, the gate roller 108 will be raised and the absorbent roll 64 which has been coated by the coating roll 103, will be discharged by the roll 103 onto a conveyor 122 which is provided for receiving the coated absorbent roll and for conveying the same to drying and ironing mechanism, which we will presently describe.

The sizing solution may be supplied to the tank 110 through an inlet pipe 123 which may be connected to a suitable source of supply such as a mixing vat or the like. The tank 110 is preferably provided with a port 124 in the side wall thereof adjacent its upper edge which will serve to prevent the solution from overflowing the tank by draining the surplus solution therefrom and discharging the same into a receptacle 125 disposed immediately below the said tank. The receptacle 125 is preferably provided with a screen cover 126 which prevents the entrance of a possible stray absorbent roll thereinto, as well as other matter, and the receptacle may be provided with an outlet 127 which may be connected to means for receiving the solution, which means preferably comprises a pump (not shown) adapted to elevate the solution to a vat such as above referred to.

The conveyor 122 which receives the absorbent rolls from the coating roll 103 preferably comprises a plurality of relatively narrow belts 128 which pass around a roll 129 disposed adjacent the coating roll 103 and journaled in suitable brackets carried by the supporting frame 15, and a roll 130 which is rotatably mounted adjacent a drying drum 131. The conveyor 122 may be driven by means of a sprocket 132 secured to the shaft of the roll 129 and a chain 133 engaging the sprocket 132 and another sprocket 134 which is secured to the driven shaft 86. The roll 129 is preferably provided with a plurality of radially projecting pins 135 which serve to prevent any of the absorbent rolls from falling off that end of the conveyor as they are dropped thereonto from the coating roll 103.

The drying drum 131 is preferably of relatively large diameter and of substantially the same or slightly greater width than the length of the absorbent rolls. This drum is provided with a plurality of transversely extending rows of radially projecting hook members 136 onto the backs of which the absorbent rolls are delivered by the conveyor 122, as clearly shown in Fig. 1. The drum 131 is provided with a shaft 137 and is rotatably mounted in suitable brackets 138 carried by a portion of the main frame 15 and this drum is rotated by means of a chain 139 which engages a sprocket 140 secured to the shaft 137 and another sprocket 141 secured to a rotatably driven shaft 142 which constitute a part of an ironing mechanism which will presently be described.

The drum 131 rotates at a relatively low speed, and the absorbent rolls delivered to the backs of the hooks 136 are carried upwardly by the drum and downwardly on the opposite side, during which portion of their movement, they roll on the surface of the drum from their initial position against the backs of the hook members to a second position against the fronts of the hook members. We have indicated a roll at 143 disposed against the backs of a row of hooks 144, and at 145 we have indicated the position of one of the rolls against the fronts of a row of hooks. As the drum continues to rotate, the absorbent rolls will be caused to roll downwardly on the fronts of the hooks until they rest on the hook portions 146 from which position they are discharged on to the ironing mechanism above referred to.

During the time the absorbent rolls are carried by the drum 131, the binder or sizing material which is applied thereto is given an opportunity to partially dry, i. e. to congeal or set. In order to insure proper delivery of the absorbent rolls by the conveyor 122 to the drying roll 13, the bearing member 130 of the conveyor is mounted so as to be adjustable in a vertical direction. Accordingly, the bearing members are mounted on the end 147 of an arm 148 which is pivotally mounted at its opposite end on the shaft 137 of the drying drum. Clamping mechanism is indicated at 149 for permitting the arms 148 to be swung about their pivotal mounting and for clamping the arms in any desired position of adjustment. The amount of adjustment required for the conveyor 122 is not of such an extent that any special means need be provided for permitting lengthening or shortening of the distance between the centers of the rolls 130 and 129 of the conveyor.

The ironing mechanism consists of a conveyor mechanism which comprises a plurality of rolls 150 which are journaled in conveyor chains 151 and 152 at opposite ends of the rolls. These chains are carried by suitable sprockets 153 and 154 which are secured to shafts 142 and 156 which in turn, are journaled in suitable brackets carried by a supporting frame 157 of any suitable construction. The shaft 156 is preferably mounted in stationary bearing members and the shaft 142 is preferably journaled in slidably mounted bearing blocks 158 so that the conveyor may be stretched or slackened as conditions require.

The ironing conveyor is driven by means of a gear train consisting of a gear 159 secured to the shaft 156 of the conveyor, idler gear 160 and a pinion gear 161 which is secured to a shaft which is journaled in a suitable supporting standard 162, and to the opposite end of which is secured a sprocket 163. The sprocket 163 receives a chain 164 which engages another sprocket 165 on a counter shaft which is journaled in suitable sprockets 166 and 167 and which is driven from the driven shaft 88 by means of a chain 168 and suitable sprockets on the respective shafts.

The conveyor is driven in the direction indicated by the arrow 169 in Fig. 1 and the rolls 150 are all caused to rotate in a common direction as they are carried from the receiving end of the conveyor to the opposite end where the absorbent rolls are discharged therefrom. The means for effecting rotation of the ironing rolls comprises a pinion gear 170 secured to an extension 171 of the shaft 172 of the rolls, by which shaft the rolls are rotatably mounted in the chains 151 and 152, and a rack 173 which is fixedly mounted on the supporting frame 157. The pinions 170 mesh with the rack 173 and as the conveyor chains move forwardly, the pinions roll on the rack and consequently cause the rolls 150 to rotate. By an inspection of Fig. 8 it will be readily understood that the absorbent rolls are discharged from the drying drum 131 on to the ironing conveyor, and that the absorbent rolls will rest on adjacent surfaces of two of the ironing rolls. It will also be apparent that as the ironing rolls are carried forward and simultaneously rotated, the absorbent rolls indicated at 174 will be caused to rotate in the reverse direction. Such rotation of the absorbent rolls between the ironing rolls will cause the absorbent rolls to be smoothed and nicely rounded.

The absorbent rolls are discharged, (as best shown in Figs. 1 and 8) from the hook members on the drum on which they are carried by means of a member 175 which is provided with fingers 176 disposed in the spaces between the hooks of each roll on the drum 131 so that as the drum rotates and the hooks pass between the fingers 176, the absorbent roll carried by the said hooks will be wiped off the hooks and caused to drop onto the ironing rolls. The member 175 is a stationary member and is mounted by means of upwardly extending legs 177 on the supporting frame 15. Suitable guide plates 178 and 179 are provided at opposite ends of the ironing rolls adjacent the drying drum for insuring proper positioning of the absorbent rolls on the ironing rolls as they are delivered thereto from the said drying drum. Such guide plates may be mounted on the supporting frame as indicated at 180, or in any other suitable manner.

The absorbent rolls are discharged from the ironing conveyor by gravity as the ironing rolls are carried about the sprockets 154. We may provide a simply tray indicated at 181 for receiving the absorbent rolls or we may provide any other suitable apparatus such as a drying mechanism for thoroughly and completely drying the rolls which may not be completely dried when they are discharged from the ironing mechanism.

As a result of continued operation of the ironing mechanism above described, the rolls 50 sometimes gather a quantity of lint or sizing material which is somewhat sticky, and such material on the surfaces of the rolls is objectionable, since it is detrimental to the ironing effect of the rolls. For the purpose of cleaning the rolls we provide a rotating brush 182 which is sprayed with hot water by means of a spray pipe 183. The brush is rotated by means of a chain 184 and suitable sprockets on the shaft 156 of the conveyor and the shaft of the brush and the brush engages the surface of the rotating ironing rollers as they pass over the brush, as best shown in Fig. 1. One or more wipers may be provided for wiping the water from the ironing rolls and such wipers may consist of a member indicated at 185 which is covered with suitable absorbent material and which member is pivotally mounted as indicated at 186 and provided with a counterweight 187 for the purpose of causing the wiper to bear against the rolls as they are carried thereover. Suitable means may also be provided for confining the water which is discharged onto the brush 184. We have indicated such means at 189 connected to a drain pipe 190.

We may also provide a suitable heating mechanism for heating and drying the ironing rolls and this mechanism preferably comprises a plurality of gas burners indicated at 188, which are disposed closely underneath the path of travel thereof. Such heating of the rolls not only dries them, but also renders them warm so as to more effectively perform their ironing operation on the absorbent rolls.

The machine above described is capable of continuous operation and is operative to produce absorbent rolls without manually handling the absorbent material from which they are made, other than to mount supply rolls of the same in the proper places on the machine. Absorbent rolls such as produced by this machine, when made of cellucotton or crepe paper are particularly advantageous as compared with absorbent rolls made of cotton and the like, in that the paper rolls are capable of absorbing a much larger quantity of fluid due to inherent characteristics of the paper and we therefore prefer to use our machine in the manufacture of such paper absorbent rolls.

We are aware that changes in the form, construction and arrangement of the machine may be made without departing from the spirit of the invention, the scope of which should be determined by reference to the following claims, which should be construed as broadly as possible, consistent with the state of the art.

We claim as our invention:

1. In a machine of the class described, the combination of means for rolling a relatively thin sheet of absorbent material upon itself to form a self-supporting roll and means for ironing the roll.

2. In a machine of the class described, the combination of means for successively rolling a plurality of relatively thin, successively fed sheets of absorbent material upon themselves to form a plurality of self-sustaining absorbent rolls, and means for receiving and ironing the rolls as they are discharged from said rolling means.

3. In a machine of the class described, the combination of means for rolling a sheet of fibrous material into a roll, means contacting with the roll for wetting substantially the whole cylindrical surface of the roll, and means for ironing the roll after it is so wetted.

4. In a machine of the class described, the combination of means for rolling a sheet of fibrous absorbent material into a roll, means for impregnating the surface portion of the roll with adhesive material, means for ironing the roll after it is so impregnated and means for causing the adhesive material on the roll to partially set before the roll is ironed.

5. In a machine of the class described, the combination of means for rolling a sheet of absorbent material into a roll, means for impregnating the surface portion of the roll with adhesive fluid, means for ironing the roll after it is so impregnated, and means for delivering the roll from the impregnating means to the ironing means, said delivering means being operative to permit the adhesive fluid to congeal before delivering the roll to the ironing means.

6. In a machine of the class described, the combination of means for rolling a sheet of absorbent material to form an absorbent roll, means for coating the surface portion of the roll with adhesive fluid, means for ironing the roll after it is so impregnated, said ironing means comprising a pair of ironing rolls adapted to receive the absorbent roll therebetween, means for rotating said ironing rolls, said ironing means being arranged to discharge the coated roll from between said ironing rolls when the ironing operation is completed.

7. In a machine of the class described, the combination of means for rolling sheets of absorbent material to form absorbent rolls, and means for ironing the absorbent rolls, said ironing means comprising a plurality of juxtaposed, axially parallel, and rotatable ironing rolls, mounted so as to be movable laterally with respect to their axes, means for so moving said ironing rolls, and means for rotating said rolls as they are so moved.

8. In a machine of the class described, the combination of means for rolling sheets of absorbent material to form absorbent rolls and means for ironing the absorbent rolls, said ironing means comprising a continuously driven endless conveyor having a plurality of juxtaposed, axially parallel, and rotatable ironing rolls, adapted to receive and support the absorbent rolls therebetween, means for rotating said rolls as the conveyor is propelled, and means for guiding said conveyor in a path of travel whereby the absorbent rolls are discharged therefrom as an incident to the travel thereof.

9. In a machine of the class described, the combination of means for rolling sheets of absorbent material to form absorbent rolls and means for ironing the absorbent rolls, said ironing means comprising a continuously driven endless conveyor having a plurality of juxtaposed, axially parallel, and rotatable ironing rolls, adapted to receive and support the absorbent rolls therebetween, means for rotating said rolls as an incident to the travel of the conveyor, and means for guiding said conveyor in a path of travel so as to cause the absorbent rolls to be discharged therefrom also as an incident to the travel thereof.

10. In a machine of the class described, the combination of means for rolling sheets of absorbent material to form absorbent rolls and means for ironing the absorbent rolls, said ironing means comprising a continuously driven endless conveyor, having a plurality of juxtaposed, axially parallel, and rotatable ironing rolls, adapted to receive and support the absorbent rolls therebetween, means for rotating said rolls as an incident to the travel of the conveyor, means for guiding said conveyor in a path of travel so as to cause the absorbent rolls to be discharged therefrom also as an incident to the travel thereof, and means for heating said rolls so as to improve the ironing effect thereof.

11. In a machine of the class described, the combination of means for rolling sheets of absorbent material to form absorbent rolls and means for ironing the absorbent rolls, said ironing means comprising a continuously driven endless conveyor having a plurality of juxtaposed, axially parallel, and rotatable ironing rolls, adapted to receive and support the absorbent rolls therebetween, means for rotating said rolls as an incident to the travel of the conveyor, means for guiding said conveyor in a path of travel so as to cause the absorbent rolls to be discharged therefrom also as an incident to the travel thereof, means for cleaning said rolls, and means for heating said rolls so as to improve the ironing effect thereof.

12. In a machine for making absorbent rolls, the combination of means for successively feeding sheets of absorbent material, means for successively rolling each of the sheets upon itself to form an absorbent roll, means for sealing the rolls to prevent unrolling thereof, comprising mechanism contacting with the rolls for coating substantially the whole cylindrical surface thereof with fluid, and means for effecting drying of the fluid.

13. In a machine for making absorbent rolls, the combination of means for feeding sheets of absorbent material, means for rolling the sheet upon itself to form the absorbent roll, means for sealing the roll to prevent unrolling thereof, comprising mechanism for impregnating the surface portion of the roll with fluid, means for ironing the rolls after they are so impregnated, whereby they will be caused to maintain the roll shape.

14. In a machine for making absorbent rolls, the combination of means for feeding sheets of absorbent material, means for rolling the sheet upon itself to form the absorbent roll, means for impregnating the surface portion of the roll with a fluid adapted to effect a stiffening of said surface portion upon drying thereof, and means for drying said surface portion.

15. In a machine for making absorbent rolls, the combination of means for rolling a sheet of absorbent material upon itself to form the absorbent roll, means for coating the roll with a binder fluid, means for effecting partial drying of said binder and means for ironing the roll after said drying is effected.

16. In a machine for making absorbent rolls, the combination of means for rolling a sheet of absorbent material upon itself to form the absorbent roll, means for coating the roll with a binder fluid, means for ironing the coated roll, and means for transferring the roll from said coating means and said ironing means through a relatively long path of travel whereby the binder is afforded time in which to partially set before the ironing operation starts.

17. In a machine of the class described, means for rolling a sheet of absorbent material upon itself to form an absorbent roll, said means comprising a drum, means for rotating said drum, means for feeding the sheet of material onto the surface of the drum, so as to be carried thereby, and a relatively stationary belt member disposed adjacent a portion of the surface of the drum and adapted to engage the forward edge of the sheet as it is carried by the drum for rolling the sheet upon itself substantially as described.

18. In a machine of the class described, a rotatably mounted drum, means for rotating said drum, means for feeding a sheet of absorbent material onto the surface of said drum so as to be carried thereby, means for rolling the sheet as an incident to its movement with the drum and compressing a relatively stationary flexible belt member having frictional contact around a portion of the surface of said drum, substantially as described.

19. In a machine of the class described, a rotatably mounted drum, means for rotating said drum, means for feeding a sheet of absorbent material onto the surface of said drum so as to be carried thereby, means for rolling the sheet as an incident to its movement with the drum and comprising a relatively stationary flexible belt member having frictional contact around a portion of said drum, and means for varying the co-efficient of friction between said belt member and said drum.

20. In a machine for making absorbent rolls, the combination of a moving member and a relatively stationary member having surface portions disposed adjacent each other, means for feeding a sheet of absorbent material onto the surface of the moving member, whereby the sheet is advanced relative to the stationary member so that the front end of the sheet engages the surface of said stationary member and is thereby turned rearwardly upon the sheet and whereby continued advancement of said sheet relative to said stationary member is effective to roll the sheet substantially as described.

21. In a machine of the class described, the combination of means for rolling a sheet of absorbent material upon itself to form an absorbent roll, means for coating the surface portion of said absorbent roll with a binder fluid and comprising a rotatably mounted coating roll, means for rotating said roll, means for applying a coating of said fluid to said coating roll, means for depositing said absorbent roll on said coating roll and means for retaining the absorbent roll in engagement with the coating roll whereby rotation of the latter is effective to rotate the absorbent roll and thereby coat the surface of the latter.

22. In a machine of the class described, the combination of means for propelling a strip of absorbent material, means for separating sheets of predetermined width from the forward end of said strip, means for rolling said separated sheets into rolls, means for sizing the surface of said rolls and means for ironing the sized rolls.

23. In a machine of the class described, the combination of means for propelling a strip of absorbent material, means for separating sheets of predetermined width from the forward end of said strip, means for rolling said separated sheets into a roll, means for sizing the surface of said roll, means for ironing the sized roll, and means for transferring the roll from the sizing means to the ironing means through a relatively long path of travel so as to permit setting of the sizing medium before the ironing operation is effected.

24. In a machine of the class described, the combination of means for propelling a strip of absorbent material, means for separating sheets of predetermined width from the forward end of said strip, means for rolling said separated sheets into rolls, means for sizing the surface of said rolls, means for ironing the sized rolls, and means for effecting a partial setting of the sizing medium before commencing the ironing operation.

25. In a machine for making absorbent rolls, means including a pair of relatively movable parts adapted to receive a sheet of absorbent material therebetween and operative to roll the material upon itself to form a self-supporting roll.

26. In a machine for making absorbent rolls, means for feeding a sheet of absorbent material forwardly, and means for turning the forward marginal portion of the sheet rearwardly upon the sheet as the latter advances, to form the inner turn in an absorbent roll, said means being operable to continue the rearward turning of the forward portion so as to roll the whole sheet.

27. In a machine for making absorbent rolls, means for feeding a sheet of absorbent material forwardly, and means for turning the forward marginal portion of the sheet rearwardly of the sheet as the latter advances, to form the inner turn in an absorbent roll, said last mentioned means being effective to continually turn the forward portion of the sheet rearwardly thereof, as the sheet continues to advance and until the entire sheet is rolled.

EDWIN E. GLOMSTEAD.
J. A. WILLIAMSON.